United States Patent [19]

Matsumoto et al.

[11] Patent Number: 4,815,317

[45] Date of Patent: Mar. 28, 1989

[54] IDLING MODE DETECTING SWITCH FOR AN INTERNAL-COMBUSTION ENGINE

[75] Inventors: Osamu Matsumoto; Hichiro Otani; Yutaka Okaue; Teruhiko Moriguchi, all of Hyogo, Japan

[73] Assignee: Mitsubishi Denki Kabushiki Kaisha, Tokyo, Japan

[21] Appl. No.: 137,580

[22] Filed: Dec. 24, 1987

[30] Foreign Application Priority Data

Dec. 26, 1986 [JP] Japan ................................ 61-203257
Dec. 26, 1986 [JP] Japan ................................ 61-203258
Dec. 26, 1986 [JP] Japan ................................ 61-203259

[51] Int. Cl.[4] ........................................... G01M 15/00
[52] U.S. Cl. ................................................... 73/118.1
[58] Field of Search ............... 73/116, 118.1; 200/245, 200/247, 248, 250, 251, 290, 340, DIG. 17

[56] References Cited

U.S. PATENT DOCUMENTS 4,118,976 10/1978 Mitsuda et al. .................... 73/118.1
4,681,994 7/1987 Nagata et al. .................. 200/340 X

FOREIGN PATENT DOCUMENTS 61-82047 5/1986 Japan .
61-82048 5/1986 Japan .

*Primary Examiner*—Jerry W. Myracle
*Attorney, Agent, or Firm*—Bernard, Rothwell & Brown

[57] ABSTRACT

An idling position detecting switch for an internal-combustion engine, comprising a conductive tubular housing mounted on a throttle body of a throttle valve for regulating fuel-air mixture supply rate provided on an intake manifold for supplying a mixture to the combustion chamber of an internal-combustion engine, a push rod axially slidably supported in the housing and having one end projecting from one end of the housing so as to be in contact with a stopper connected to a valve shaft of the throttle valve, and the other end disposed within the housing and provided at the extremity thereof with a movable contact, a fixed contact disposed opposite to the movable contact within the housing, and a spring urging the push rod toward the stopper so that the movable contact is separated from the fixed contact and absorbing shocks applied to the push rod by the stopper of the throttle valve. The spring has one end firmly fixed to the push rod at a position near the movable contact and the other end firmly fixed to an inner surface of the housing. A detention mechanism is provided to prevent the turning motion of the spring within the housing due to a turning effect resulting from an axial sliding movement of the push rod.

9 Claims, 3 Drawing Sheets

IDLING MODE DETECTING SWITCH FOR AN INTERNAL-COMBUSTION ENGINE

BACKGROUND OF THE INVENTION

1. Field of the Invention

The present invention relates to an idling mode detecting switch for an internal-combustion engine.

2. Description of the Prior Art

In an internal-combustion engine, fuel supply rate is controlled according to the degree of opening of the throttle valve, and an idling mode detecting switch is used for detecting the idling mode of the internal combustion engine, in which the throttle valve is in an idling position.

Referring to FIG. 1 showing a conventional idling mode detecting switch, a substantially tubular housing 2 attached to a throttle body 1 is internally provided with a push rod 3, a movable contact 4 provided at the lower end of the push rod, and a fixed contact 5 disposed opposite to the movable contact 4. The throttle body 1 is mounted on an engine, not shown, and is grounded through the engine. The push rod 3 is slidably supported in a diametrically small guide portion 6*a* of a substantially tubular guide sleeve 6. The upper end of the push rod 3 projects from the upper opening of the housing 2. An annular plate 7 is mounted coaxially on the lower portion of the push rod 3 extending within a diametrically expanded portion 6*b* of the guide sleeve 6. A substantially tubular insulator 8 having a flange 8*a* is disposed within the lower expanded portion of the housing 2 with the flange 8*a* thereof fitting the opening of the lower expanded portion of the housing 2. The lower end of the push rod 3 is received slidably and close in the boss 8*b* of the insulator 8. A lead plate, 9 is provided between the lower end surface of the diametrically expanded portion 6*b* of the guide sleeve 6 and the flange 8*a* of the insulator 8. A spring 10, i.e., a resilient member, is extended between the plate 7 and the lead plate 9 so as to bias the push rod 3 toward an actuating end portion 12*a* of a stopper 12 connected to the valve shaft 11 of the throttle valve. When the stopper 12 is brought into contact with the upper end of the push rod 3 to apply pressure thereto, the push rod 3 is caused to slide axially downward against the resilience of the spring 10.

The fixed contact 5 is connected to a terminal 13 extending outside through a resin connector 14 fitted in the lower opening of the housing 2. The connector 14 is secured to the housing 2 by caulking a fastening portion 15 of the lower extension of the housing 2. The connector 14 serves also as an insulating cap for closing the lower opening of the housing 2. The outer circumference of the upper portion of the housing 2 is threaded to form a threaded portion 2*a*, which is screwed in a threaded hole 1*a* formed in the throttle body 1 to attach the housing 2 to the throttle body 1. Indicated at numeral 16 is a sealing rubber boot put on the upper end of the housing 2.

The function of the idling mode detecting switch thus constructed will be described hereinafter.

The valve shaft 11 of the throttle valve turns clockwise, as viewed in FIG. 1, as the degree of opening of the throttle valve is decreased. The stopper 12 is positioned relative to the valve shaft 11 so that the actuating end portion 12*a* of the stopper 12 presses the push rod 3 downward against the resilience of the spring 10 to bring the movable contact 4 provided on the lower end of the push rod 3 into contact with the fixed contact 5 at a particular degree of opening of the throttle valve. Then, an electric current supplied through the terminal 13 flows through the fixed contact 5, the push rod 3, the plate 7, the spring 10, the lead plate 9, the housing 2 and the throttle body 1 to the earth, and thereby the idling mode of the internal-combustion engine is detected.

In this conventional idling mode detecting switch, the plate 7 and the lead plate 9 are kept in contact with the opposite ends, respectively, of the spring 10 for electrically connecting the spring plate 7 and the lead plate 9 merely by the resilience of the spring 10. In such a case, it is possible that a detection signal of a sufficiently high level is unavailable due to contact resistances between the plate 7 and the spring 10 and between the lead plate 9 and the spring 10. Such an adverse tendency is enhanced when the contact surfaces of the plate 7 and the lead plate 9 are smeared with oil or oxidized. The electrical contact between the plate 7 and the spring 10 and between the lead plate 9 and the spring 10 is unstable and the level of the detection signal is liable to change for the same reason because the condition of contact between the plate 7 and the spring 10 and between the lead plate 9 and the spring 10 changes if the spring 10 turns relative to the plate 7 and the lead plate 9.

Furthermore, every time the actuating end portion 12*a* of the stopper 12 attached to the valve shaft 11 of the throttle valve is brought into contact with the push rod 3, the action pressure applied to the push rod 3 by the stopper 12 is transmitted through the fixed contact 5 directly to the connector 14 serving also as the insulating cap to expand and loosen the caulked fastening portion 15. Consequently, the connector 14 is moved outward relative to the housing 2 causing the idling mode detecting position to deviate from the correct position, or a portion of the connector 14 adjacent to the caulked fastening portion 15 is caused to creep.

SUMMARY OF THE INVENTION

The present invention has been made to eliminate the foregoing drawbacks of the conventional idling mode detecting switch and it is therefore a first object of the present invention to provide an idling mode detecting switch capable of stably and surely providing an idling mode detection signal upon the detection of the arrival of the throttle valve at the idling position.

It is a second object of the present invention to provide an idling mode detecting switch capable of preventing the creep of the connector 14 and transmitting a reduced force to the fastening portion of the housing when a pressure is applied to the push rod by the actuating end portion 12*a* of the stopper 12 attached to the valve shaft 11 of the throttle valve.

To achieve the first object of the invention, the present invention provides an idling mode detecting switch including a spring, corresponding to the spring 10, whose opposite ends are securely fixed to the associated members such as the plate and the lead plate, respectively, and detention means which is provided in a movable system including a push rod and which prevents an undesirable load on the spring resulting from the turning motion of the push rod.

To achieve the second object of the invention, the present invention provides an idling mode detecting switch including a supporting disk held between the lower open end of a housing and an insulating cap secured to the lower open end of the housing by caulking so as to be resiliently biased toward the housing.

DETAILED DESCRIPTION OF THE PREFERRED EMBODIMENTS

Preferred embodiments of the present invention will be described hereinafter with reference to the accompanying drawings.

Figure 1:
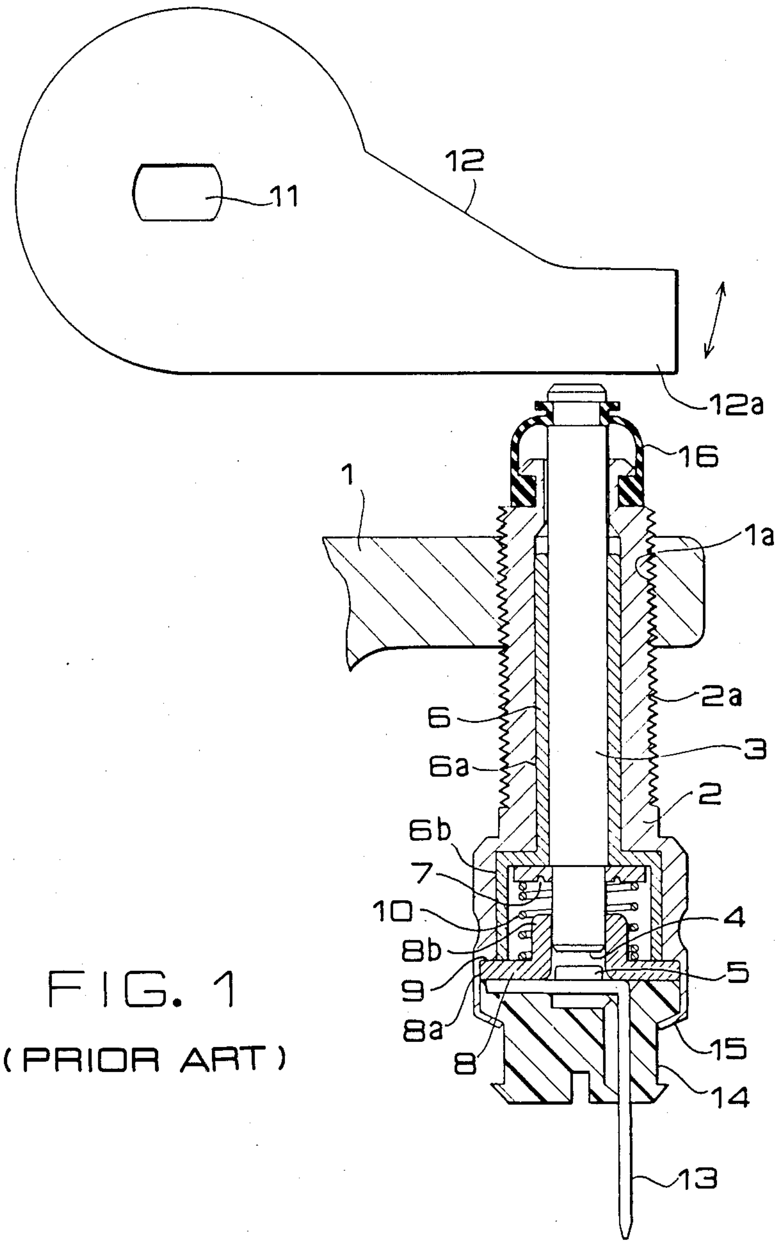
FIG. 1 (PRIOR ART)
FIG. 1 is an axial sectional view of a conventional idling mode detecting switch for an internal-combustion engine.
Figure 3:
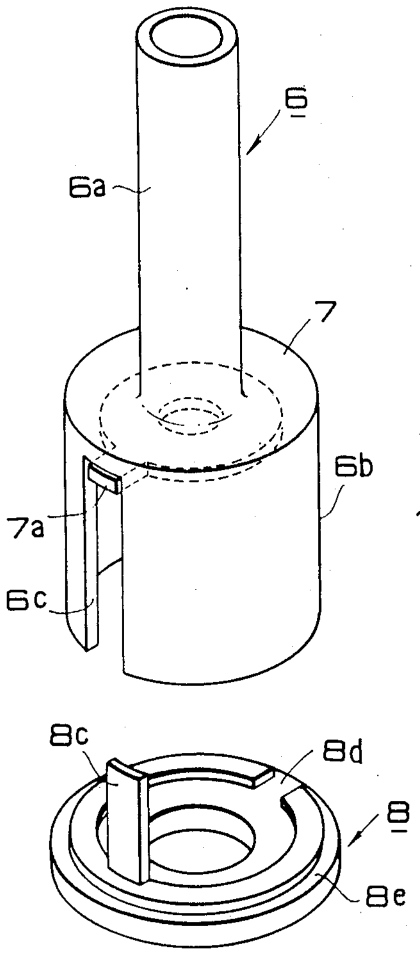
FIG. 3 is an exploded perspective view of assistance in explaining the construction of a detention mechanism for checking the turning motion of a push rod guide and a spring bearing plate in the idling mode detecting switch of FIG. 2.
Figure 2:
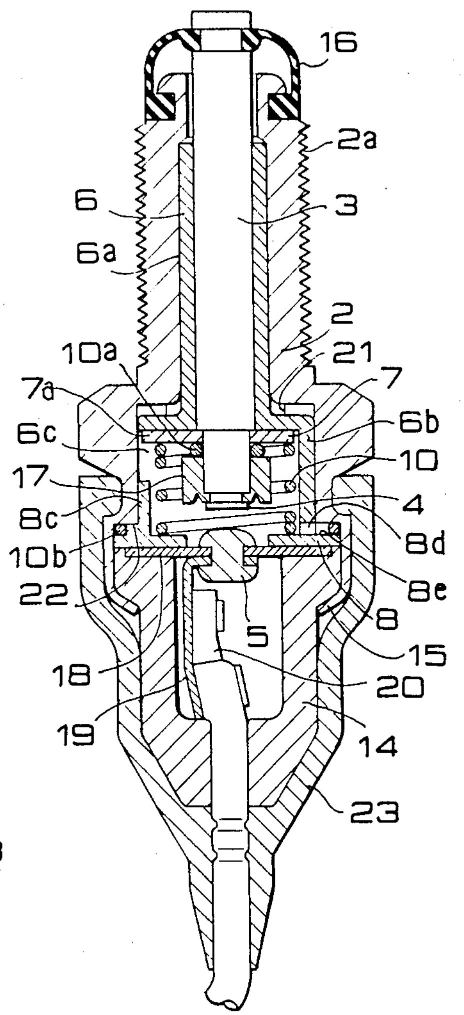
FIG. 2 is an axial sectional view of an idling mode detecting switch, in a first embodiment, according to the present invention.

In FIGS. 2 and 3 illustrating the first embodiment, parts corresponding to those of the conventional idling mode detecting switch described with reference to FIG. 1 are denoted by the same reference numerals and the description thereof will be omitted.

Shown in FIGS. 2 and 3 are a fixed ring 17 fixed to the lower end of a push rod 3, a supporting disk 18 supporting a fixed contact 5, a terminal strip 19 disposed in electrical contact with the fixed contact 5 supported on the supporting disk 18, the free end 20 of a lead wire clinched to the terminal strip 19, a shoulder 22 formed in the lower open end of a housing 2.

Referring to FIG. 2, the upper end of the spring 10 is reduced to form a small reduced coil portion **10*a* having an inside diameter coinciding with the diameter of the lower end of the push rod 3. The fixed ring 17 is fastened to the lower end of the push rod 3 to hold the small coil portion 10*a* between the fixed ring 17 and a plate 7 coaxially mounted on the push rod 3. Thus, the spring 10 is connected electrically securely at the upper end thereof to a movable contact 4 attached to the lower end of the push rod 3. The lower end of the spring 10 is expanded to form an expanded coil portion 10*b*. The expanded coil portion 10*b* of the spring 10 is received in a guide groove 8*e* formed in the outer circumference of an insulator 8 so as to rest on the shoulder 22 of the housing 2. Thus, the spring 10 is connected electrically and firmly at the lower end thereof to the housing 2. The expanded coil portion 10*b* of the spring 10 is held firmly between the insulator 8 and the housing 2 when a connector 14 is fastened to the housing 2 by caulking the fastening portion 15 of the housing 2**.

The lower end of the wire forming the spring 10 is bent radially outward so as to extend through a recess **8*d* formed in the insulator 8 and is coiled to form the expanded coil 10*b*. As mentioned above, the guide groove 8*e* is formed in the outer circumference of the insulator 8. A projection 8*c* is formed so as to extend upright from the upper surface of the insulator 8 at a position diametrically opposite the recess 8*d*. The lower end of a guide sleeve 6 is expanded to form a diametrically expanded portion 6*b*. The guide sleeve 6 is received coaxially in the housing 2 so that the lower end of the diametrically expanded portion 6*b* is located opposite to the insulator 8. The spring 10 and the movable contact 4 are enclosed substantially by the diametrically expanded portion 6*b*. A slot 6*c* is formed in the diametrically expanded portion 6*b* to receive the projection 8*c* of the insulator 8. A radial projection 7*a* formed in the plate 7 is axially movably received in the slot 6*c***.

FIG. 3 illustrates the construction of a detention mechanism for preventing the turning motion of the plate 7 relative to the guide sleeve 6. The diametrically small guide portion **6*a* of the guide sleeve 6 is fitted in the housing 2 by pressure so that the guide sleeve 6 is unable to turn relative to the housing 2. The insulator 8 is held between the expanded coil 10*b* of the spring 10 and the connector 14, so that the insulator is unable to turn relative to the housing 2**.

A wave washer 21 is provided between the housing 2 and the expanded portion **6*b* of the guide sleeve 6. The connector 14 is enclosed by a rubber boot 23**.

The plate 7 electrically connecting with the movable contact 4 is connected electrically and surely through the spring 10 to the housing 2 which in turn is grounded. Only an axial force acts on the spring 10 and no rotative force resulting from the turning of the push rod 3 acts on the spring 10. That is, the detention mechanism prevents the spring 10 extended between a movable system including the push rod 3, and a fixed system from being subjected to strains acting in directions other than the direction of expansion and contraction of the spring 10 due to vibrations or the accidental turning motion of the push rod 3 about its axis.

Although, in the first embodiment, the spring 10 is held fixedly at the opposite ends thereof between the associated members to connect the spring 10 fixedly to the associated members, means for fixedly connecting the spring 10 to the associated members need not be limited to such a construction; the spring 10 may be fastened to the associated members by welding, caulking or clinching for the same effect. Obviously, the detention mechanism for checking the movable system need not be limited to that described above by way of example, but various detention mechanisms are applicable for the same purpose.

Figure 4:
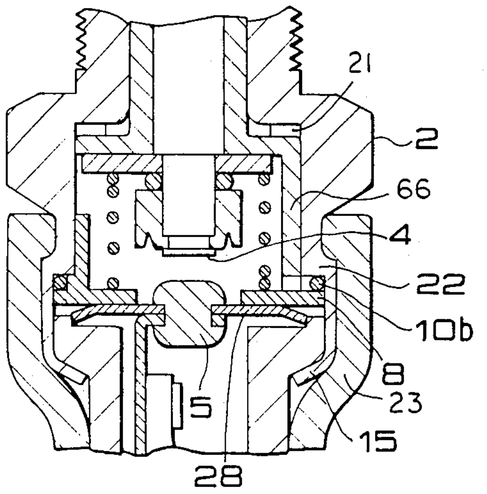
FIG. 4 is a sectional view of a portion of an idling mode detecting switch, in a second embodiment, according to the present invention.
Figure 5A:
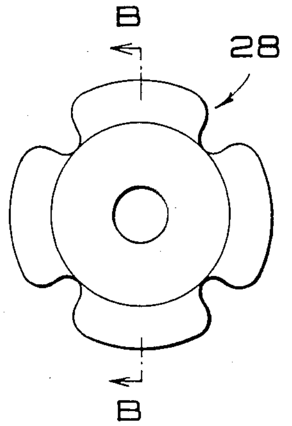
FIG. 5 is a plan view of a supporting disk employed in the idling detecting switch of FIG. 4.
FIG. 5B is a sectional view taken on line B—B in FIG. 5A.
Figure 5B:
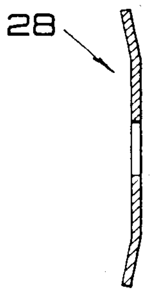

Although, in the first embodiment, the supporting disk 18 interposed between the insulator 8 and the connector 14 is a flat disk as illustrated in FIG. 2, the present invention is not limited thereto, but a supporting disk 28 as a second embodiment shown in FIGS. 4, 5A and 5B may be used.

An idling mode detecting switch, in the second embodiment, according to the present invention employs the supporting disk 28. The supporting disk 28 is formed of a spring plate in a shape as best shown in FIG. 5A and is warped beforehand as best shown in FIG. 5B. When the supporting disk 28 is used, the supporting disk 28 raises the fixed contact 5 relative to the connector 14 and, at the same time, raises the insulator 8 to hold the expanded coil portion **10*b* of the spring 10 between the insulator 8 and the housing 2 in case the caulked fastening portion 15 is loosened and the connector 14 is allowed to move away from the housing 2 as illustrated in FIG. 4, so that the position of the fixed contact 5** remains unchanged and hence the idling mode detecting position remains unchanged.

It is possible, for the same effect, to employ a flat supporting disk instead of the supporting disk 28 formed of a spring plate and warped beforehand and to provide an elastic member, such as a wave washer, between the flat supporting disk and the connector 14 serving also as an insulating cap.

The second embodiment, similarly to the first embodiment shown in FIG. 2, is provided with a wave washer 21 interposed between the housing 2 and the expanded portion 6b of the guide sleeve 6, and a rubber boot 23 for enclosing the connector 14.

Thus, the idling mode detecting switch thus constructed according to the present invention maintains a correct idling mode detecting position for an extended period of service, reduces shocks on the caulked portion and prevents the creep of the resin members.

As apparent from the foregoing description, the idling mode detecting switch for an internal-combustion engine, according to the present invention has the following effects.

First, the idling mode detecting switch of the present invention detects the movement of the push rod surely when the throttle valve is brought into an idling position, and thereby the reliability of the idling mode detecting system is improved.

Secondly, the idling mode detecting switch of the present invention prevents the turning motion of the movable contact and allows the movable contact to move only in axial directions, and thereby the spring is not exposed to unnecessary forces and hence the spring is not damaged.

Thirdly, the idling mode detecting switch according to the present invention maintains the idling mode detecting position for an extended period of service, reduces shocks on the caulked portions and prevents the creep of the resin members, and thereby the reliability of the idling mode detecting system is improve.

What is claimed is:

1. An idling mode detecting switch for an internal-combustion engine, wherein said detecting switch is connected to an intake manifold of said engine for supplying a fuel-air mixture to a combustion chamber of said engine, and is fixedly mounted to a throttle body of a throttle valve for regulating a supply air flow rate of the fuel-air mixture, said detecting switch comprising:

(a) a substantially tubular housing which is formed of an electrically conductive material, fixedly mounted on and electrically connected to said throttle body;

(b) a push rod slidably supported in said housing and having one end portion projecting from one end of said housing so as to come into contact with a stopper attached to a throttle shaft in said throttle body, and having the other end portion located within said housing and having a movable contact electrically connected to said housing for grounding;

(c) a fixed contact provided within said housing opposite to said movable contact and insulated from said housing; and (d) an electrically conductive spring which urges said push rod toward said stopper, said stopper pressing said push rod against an energizing force of said spring to cause said movable contact to engage said fixed contact at the idling position of said throttle valve;

(e) one end of said spring being securely fixed to said push rod at a position near said movable contact, the other end of said spring being firmly fixed to said housing; and (f) a detention mechanism for preventing turning of the spring within the housing.

2. An idling mode detecting switch according to claim 1 and further comprising:

(a) a fixed ring mounted on said push rod adjacent said movable contact;

(b) a guide sleeve surrounding said push rod and having a shoulder thereon;

(c) one end of said spring being disposed between said shoulder and said fixed ring to provide electrical conduction to said push rod; and (d) an insulator having a circular flange formed thereon, said circular flange having a notch formed therein.

(e) the other end of said spring including a portion extending through said notch and being held between said guide sleeve and said insulator.

3. An idling mode detecting switch according to claim 2, wherein said detention mechanism comprises an axial slot in said guide sleeve and a boss extending from said insulator and engaging said slot.

4. An idling mode detecting switch for an internal-combustion engine, wherein said switch is connected to an intake manifold of said engine for supplying a fuel-air mixture to a combustion chamber of said engine, and is fixedly mounted to a throttle body of a throttle valve for regulating a supply air flow rate of the fuel-air mixture, said detecting switch comprising:

(a) a substantially tubular housing which is formed of an electrically conductive material;

(b) a push rod slidably supported in said housing and having one end portion projecting from one end of said housing so as to come into contact with a stopper attached to a throttle shaft mounted in said throttle body; and having the other end portion located within said housing and having a movable contact electrically connected to said housing for grounding;

(c) an insulating connector fixed to the other end of said housing and having a recess therein;

(d) a fixed contact provided within the housing opposite to said movable contact and insulated from said housing; and, (e) a bearing plate mounted on said push rod at said other end of said push rod;

(f) a fixed insulator;

(g) an electrically conductive spring extending between said fixed insulator and said bearing plate and urging said push rod toward said stopper:

(h) a resilient shock absorbing mechanism supported on said connector and extending across said recess;

(i) said fixed contact being secured to the shock absorbing mechanism and disposed opposite to said movable contact;

(j) a lead wire extending through a hole in said connector and extending into said recess, said lead wire having a terminal connected to said fixed contact.

5. An idling mode detecting switch according to claim 4, wherein said shock absorbing mechanism is an annular supporting plate having a central hole for securely holding said fixed contact, and said terminal is connected electrically to said fixed contact and the supporting plate.

6. An idling mode detecting switch according to claim 4, wherein said connector fixed to the other end of said housing and serves as an insulating cap for closing an opening in said other end of said housing and for electrically insulating said fixed contact and said terminal from said housing, and a protective rubber boot mounted on said other end of said housing and covering said connector and said other end of said housing, said lead wire extending through said boot.

7. An idling mode detecting switch according to claim 4, wherein said shock absorbing mechanism is an annular plate having central portion and a peripheral portion bent at an obtuse angle to said central portion toward said connector.

8. An idling mode detecting switch according to claim 4, wherein said shock absorbing mechanism is an annular plate having a central portion and having a plurality of elastic petaline lugs extending from the outer circumference of said central portion and bent at an obtuse angle to said central portion.

9. An idling mode detecting switch according to claim 4, wherein said shock absorbing mechanism is a disk member and said spring assists the shock absorbing action of said shock absorbing mechanism.

* * * * *